United States Patent [19]

Hattori et al.

[11] Patent Number: 4,714,423

[45] Date of Patent: Dec. 22, 1987

[54] EVACUATING DEVICE FOR PLUNGER MOLDING APPARATUS

[75] Inventors: Isao Hattori; Shigeru Furukawa, both of Nagoya, Japan

[73] Assignee: NGK Insulators, Ltd., Japan

[21] Appl. No.: 947,830

[22] Filed: Dec. 29, 1986

[30] Foreign Application Priority Data

Dec. 13, 1986 [JP] Japan .................... 61-191133[U]

[51] Int. Cl.$^4$ .................... B29C 47/54; B29C 47/76
[52] U.S. Cl. .................... 425/376 R; 72/273; 164/312; 222/387; 251/318; 251/357; 251/900; 417/435; 425/405 R; 425/542; 425/544; 425/546; 425/812
[58] Field of Search .......... 425/542, 544, 574, 376 R, 425/326.1, 812, 546, 405 R, DIG. 60; 222/387; 72/273; 417/435; 251/318, 357, 900; 164/312

[56] References Cited

U.S. PATENT DOCUMENTS

| | | | |
|---|---|---|---|
| 2,599,622 | 6/1952 | Folmsbee | 251/900 |
| 2,764,385 | 9/1956 | Sieling | 251/357 |
| 2,904,830 | 9/1959 | Mulrooney | 425/376 R |
| 3,282,074 | 11/1966 | Gardner | 72/273 |
| 3,776,260 | 12/1973 | Ruddick | 251/318 |
| 3,960,201 | 6/1976 | Portalier | 164/312 |
| 3,970,109 | 7/1976 | Uerlichs et al. | 251/900 |
| 4,234,162 | 11/1980 | Kay | 251/900 |

*Primary Examiner*—Willard E. Hoag
*Attorney, Agent, or Firm*—Parkhurst & Oliff

[57] ABSTRACT

An evacuating device for a plunger molding apparatus including a material cylinder for receiving a blank to be extruded, a ram head slidably engageable in the material cylinder, a hydraulic plunger having a piston connected to the ram head, an evacuating cap provided slidably in an air-tight manner on the piston and having evacuating pipes, and a blowdown valve provided in the ram head for closing and opening an air blow aperture formed in the ram head. The ram head has a flat surface which is in contact with the blank in the material cylinder. An O-ring is arranged in the flat surface of the ram head about the air blow aperture. The blowdown valve consists of a stem and a head which is brought into contact with the flat surface of the ram head through the O-ring when the ram head is being advanced, thereby improving the air-tightness between the ram head and the blowdown valve to prevent the ceramic batch from entering the air blow aperture. Upon retraction of the ram head, therefore, the air blowing through the blowdown valve can be beneficially effected with ease.

3 Claims, 4 Drawing Figures

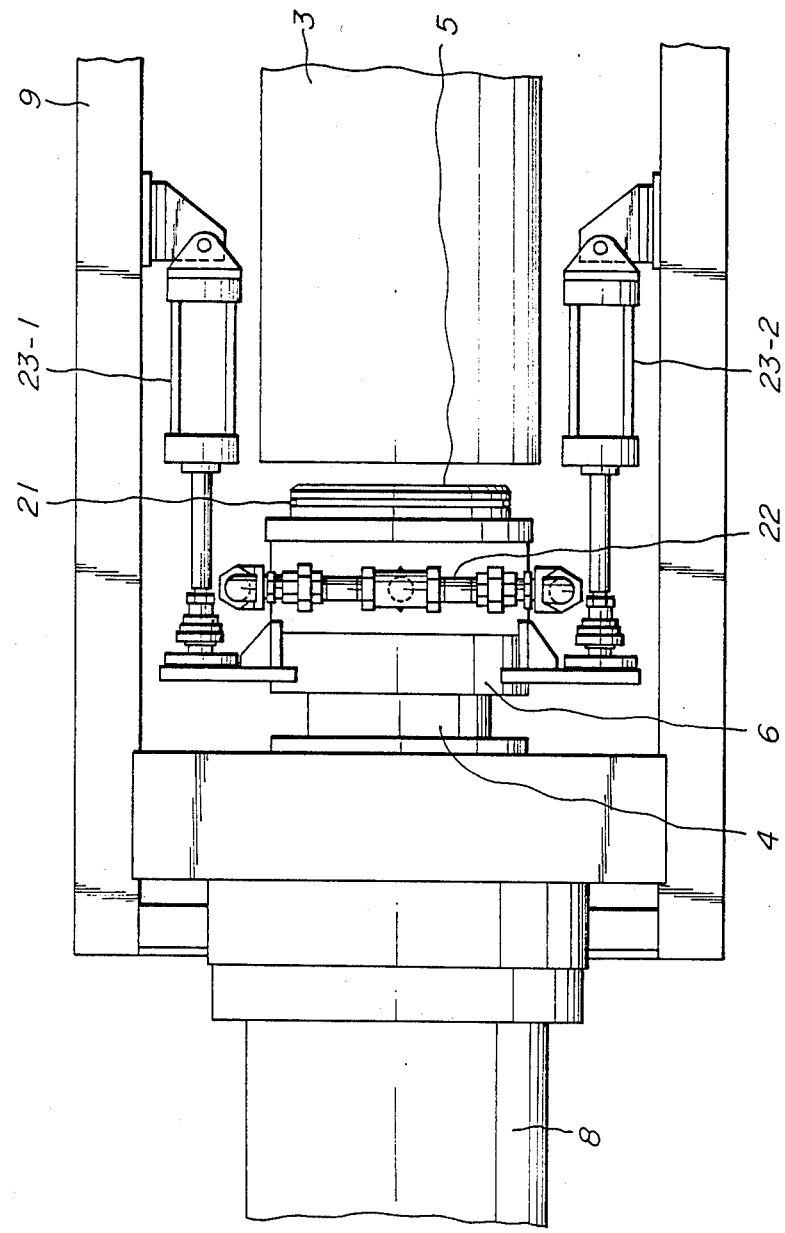

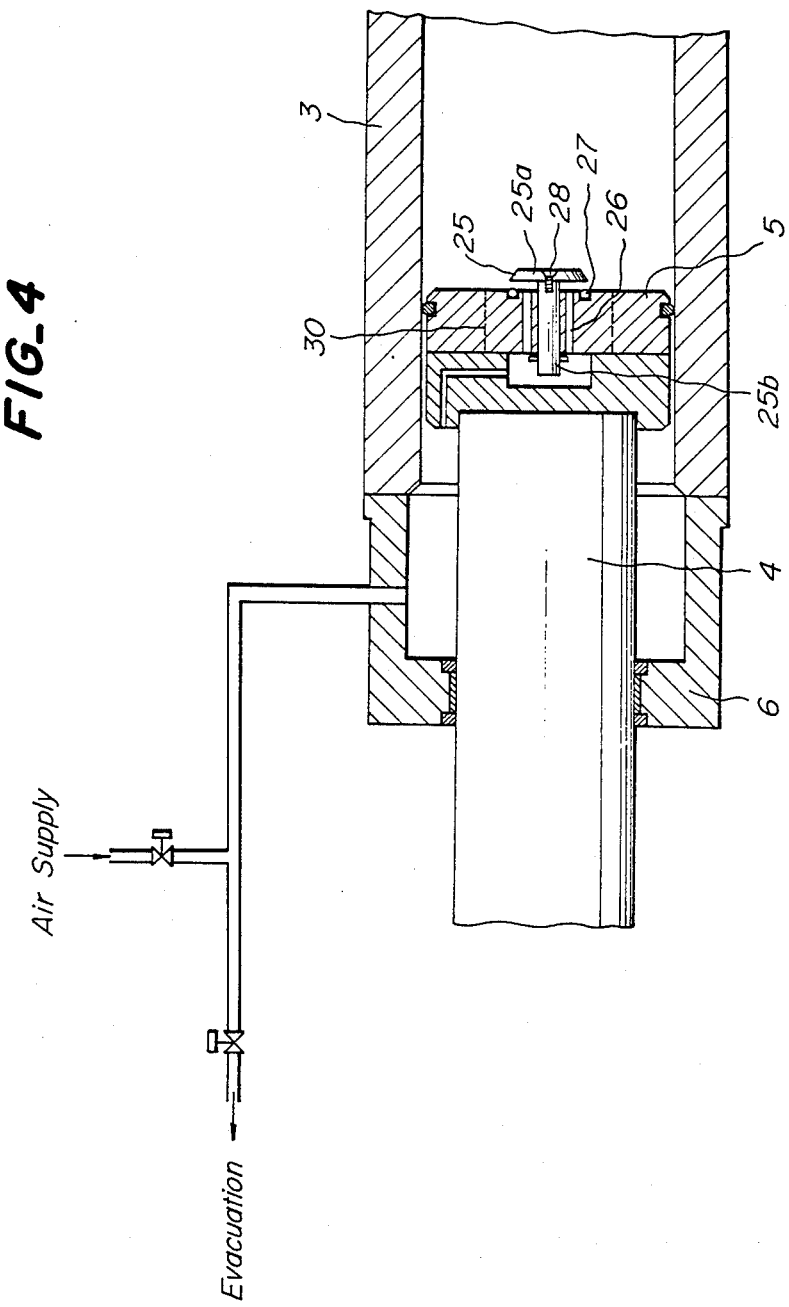
FIG_4

EVACUATING DEVICE FOR PLUNGER MOLDING APPARATUS

BACKGROUND OF THE INVENTION

This invention relates to an evacuating device for a plunger molding machine for producing molded products of ceramic batch.

With a hitherto used evacuating device for a plunger molding machine, before extruding ceramic batch supplied in a material cylinder, an evacuating cap is mounted in an air-tight manner on an end of the material cylinder to evacuate the air in the material cylinder by means of evacuating pipes so as to bring the interior of the material cylinder into a condition near to vacuum. Thereafter, a hydraulic plunger is actuated to drive its piston so as to insert a ram head into the material cylinder, thereby extruding the ceramic batch therefrom to obtain a desired molded product.

With such an evacuating device of the prior art described above, however, the interior of the material cylinder still remains under the condition near to vacuum when the piston is being retracted after completion of the extrusion of the ceramic batch from the material cylinder. As a result, part of the ceramic batch sticking to an extruding die and remaining in the material cylinder would break down, rise or partially exist in the material cylinder to form an obstruction in extruding a next ceramic batch.

Moreover, such a prior art evacuating device has a further disadvantage in that a great pulling force and a long period of time are required in order to draw the piston off and material cylinder under the condition near to vacuum.

In order to eliminate the disadvantages above described, one of the inventors of the present application proposed in Japanese Utility Model Application No. 153,575/85 an evacuating device for a plunger molding machine comprising a ram head provided with a blowdown valve which enables a piston to be simply retracted from the material cylinder.

With such an evacuating device, as shown in FIG. 1 illustrating the ram head on an enlarged scale a head 31a of the blowdown valve 31 is tapered in a frustoconical shape which is adapted to be seated on a corresponding frustoconical recess of the ram head 32 to form a seal therebetween. Therefore in using high pressure, a slight amount of ceramic material often enters between the head of the blowdown valve and the ram head probably due to the funnel-shaped recess thereby clogging an air blow aperture 33, so that the blowdown valve does not perform sufficiently. As a result, a troublesome and time-consuming operation is needed for repairing and cleaning the blowdown valve.

SUMMARY OF THE INVENTION

It is a principal object of the invention to provide an evacuating device for a plunger molding machine for ceramic batches, which eliminates all the disadvantages of the prior art and which is able to effect reliably air blowing through a blowdown valve without clogging of the blowdown valve and enables a piston to be drawn off a material cylinder simply and exactly.

In order to achieve this object, in an evacuating device for a plunger molding apparatus, including a material cylinder for receiving a blank to be extruded, a ram head slidably engageable in said material cylinder, a hydraulic plunger having a piston connected to said ram head, an evacuating cap provided slidably in an air-tight manner on said piston and having evacuating pipes, and a blowdown valve provided in said ram head for closing and opening an air blow aperture formed in said ram head, according to the invention said ram head comprises a flat surface which is in contact with said blank in said material cylinder, and an O-ring arranged in said flat surface of said ram head about said air blow aperture, and said blowdown valve comprises a T-shaped head which is brought into contact with said flat surface of said ram head through said O-ring to close said air blow aperture when the ram head is being advanced in said material cylinder to extrude said blank therefrom.

In a preferred embodiment of the invention, the blowdown valve comprises a stem and the T-shaped head is connected to the stem by means of at least one set screw.

In another preferred embodiment of the invention, a center portion of the ram head formed with the air blow aperture cooperating with the blowdown valve is made of a stainless steel different from a material of a remaining portion of the ram head.

With these arrangements according to the invention, the head of the blowdown valve is brought into contact with the flat surface of the ram head through the O-ring when the ram head is being advanced, thereby improving the air-tightness between the ram head and the blowdown valve to prevent the ceramic batch from entering the air blow aperture. Upon retraction of the ram head, thereafore, the air blowing through the blowdown valve can be beneficially effected with ease.

Moreover, the center portion of the ram head where the blowdown valve is provided is made of a stainless steel to increase a strength of the ram head. Furthermore, the head of the blowdown valve is connected to the stem by means of a set screw to facilitate removal of the head from the stem thereby making inspection or other handling of the blowdown valve simple.

In order that the invention may be more clearly understood, preferred embodiments will be described, by way of example, with reference to the accompanying drawings.

BRIEF DESCRIPTION OF THE DRAWINGS

FIG. 3 is a plan view of one embodiment of the evacuating device according to the invention; and FIG. 4 is a partial sectional view of the device shown in FIG. 2 for explaining the operation thereof.

DESCRIPTION OF THE PREFERRED EMBODIMENT

Figure 1:
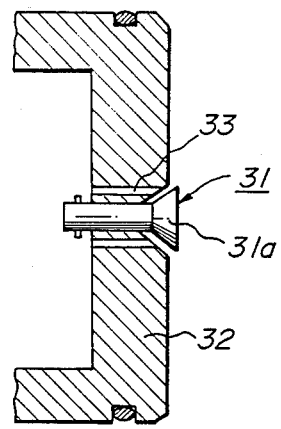
FIG. 1 is a schematical sectional view illustrating a part of a ram head of the prior art on an enlarged scale.
Figure 2:
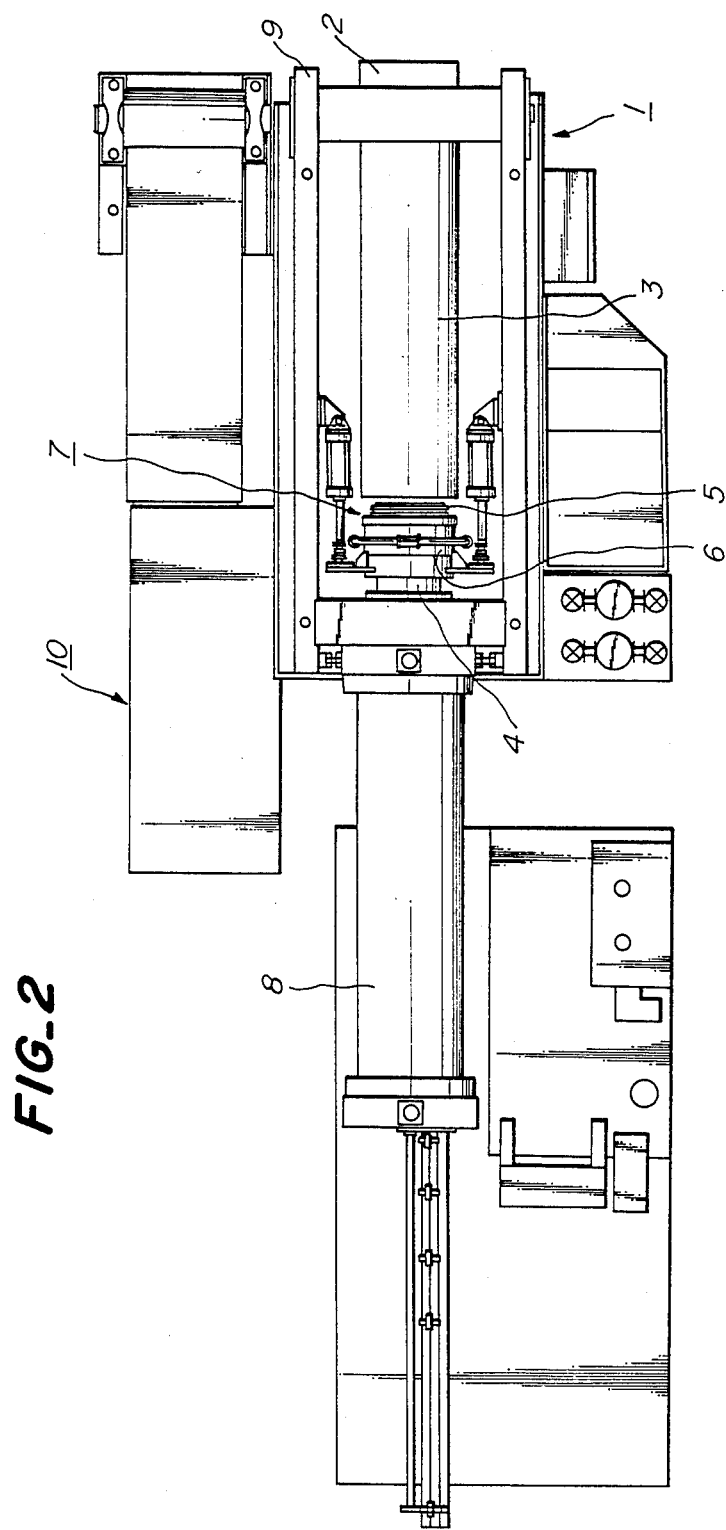
FIG. 2 is a plan view of a plunger molding machine equipped with an evacuating device as one embodiment of the invention.

FIG. 2 is a schematic view illustrating one embodiment of a plunger molding machine equipped with an evacuating device according to the invention. In this embodiment the plunger molding machine 1 comprises a material cylinder 3 having at one end an extruding die 2, the evacuating device 7 including a ram head 5 and an evacuating cap 6, and a hydraulic plunger 8 whose piston is connected to the evacuating device 7. These members are arranged on a base 9. With this arrangement, for example, after a cylindrical blank of a ceramic material is loaded into the material cylinder 3 by means of a blank loading device 10, the material cylinder 3 is evacuated by means of the evacuating cap 6 and the hydraulic plunger 8 is actuated to insert the ram head 5 into the material cylinder 3 by means of the piston 4 to extrude the blank through the extruding die 2, thereby obtaining a desired molded product.

FIGS. 3 and 4 are plan and front views illustrating one embodiment of the evacuating device according to the invention. In FIGS. 3 and 4, like components are designated by the same reference numerals as those used in FIG. 2 and will not be described in further detail.

As shown in FIG. 3, an O-ring 21 is provided on an outer circumference of a ram head 5 which cooperates with a piston 4 and has a size engageable with a material cylinder 3, so that an air-tightness is maintained between the ram head 5 and the material cylinder 3 when the former is inserted in the latter. Moreover, an evacuating cap 6 having evacuating pipes 22 is provided so as to cover the ram head 5 and is arranged on a piston 4 slidably thereon in an air-tight manner. This evacuating cap 6 is driven by pneumatic cylinders 23-1 amd 23-2 whose ends are fixed to a base 9. These pneumatic cylinders 23-1 and 23-2 serve to bring the evacuating cap 6 into close contact with the material cylinder 3 for the purpose of evacuating the material cylinder 3 for inserting the ram head 5 into the material cylinder 3.

A blowdown valve 25 comprising a head 25a and a stem 25b is provided in a center of the ram head 5 constituting the evacuating device 7 according to the invention as shown in FIG. 4. The blowdown valve 25 serves to close and open an air blow aperture 26 formed in the center of the ram head 5. With the blowdown valve being closed, the head 25a of the blowdown valve 25 is in contact with an O-ring 27 provided in the ram head 5 about the air blow aperture 26 to maintain the sealing of the air blow aperture.

In this embodiment, the head 25a is connected to the stem 25b of the blowdown valve 25 by means of a flat head set screw, and a center of the ram head 5 provided with the O-ring 27 and the air blow aperture 26 is made of a stainless steel as shown in phantom lines 30 in FIG. 4. However, the same effect of the present invention is of course accomplished by a blowdown valve made of a single piece and a ram head made of a single material.

The actual blank extruding operation using the evacuating device 7 according to the invention as above described will be carried out in the following manner. First, the ram head 5 is kept fixed, and the pneumatic cylinders 23-1 and 23-2 are actuated to bring the evacuating cap 6 into close contact with the material cylinder 3. Under this condition, the material cylinder 3 is evacuated with the aid of the evacuating cap 6 having the pipes 22 so as to be under a condition near to vacuum. The hydraulic plunger 8 is then actuated to insert the ram head 5 having the blowdown valve 25 into the material cylinder 3 with the aid of the piston 4 so as to extrude the blank in the material cylinder 3 therefrom. In this case, the blowdown valve 25 is closed when it abuts against the blank.

After the completion of extruding the blank, a small amount of air at a pressure 1–4 kg/cm$^2$ is supplied into the material cylinder 3 through the pipes 22 of the evacuating cap 6 in close contact with the material cylinder 3 to cause a pressure difference across the ram head 5 in the material cylinder 3. The pressure difference causes the blowdown valve 25 to open. Thereafter, while the pipes 22 continue to supply the air into the material cylinder 3, the hydraulic plunger 8 is actuated to return the ram head 5 to its initial position, and the pneumatic cylinders 23-1 and 23-2 are actuated to return the evacuating cap 6 to its original position. As a result, a space between the ram head 5 and the blank becomes under a pressure near to atmospheric pressure when the ram head 5 is about to be drawn from the material cylinder 3 after completion of extruding the blank. Accordingly, the ram head 5 is easily and simply drawn from the material cylinder 3.

Although the blank is extruded in a horizontal direction in the above embodiment, this is only by way of example, and the blank may be extruded in a vertical or oblique direction.

As can be seen from the above description, the evacuating device for the plunger molding machine according to the invention comprises the blowdown valve having the head adapted to be brought into contact with the flat surface of the ram head through the O-ring when the ram head is being advanced, thereby improving the air-tightness between the ram head and the blowdown valve to prevent the ceramic batch from entering the air blow aperture. Therefore, upon retraction of the ram head, the air blowing through the blowdown valve can be beneficially effected with ease. The T-shaped head of the blowdown valve covering the air blow aperture with its flat surface and the air blow aperture devoid of the funnel-shaped portion make it difficult for the blank to enter the air blow aperture. Accordingly there is less chance of the air blow aperture being clogged by the ceramic blank. Therefore, the air blowing can be effectively carried out through the blowdown valve according to the invention.

It is further understood by those skilled in the art that the foregoing description is that of preferred embodiments of the disclosed devices and that various changes and modifications may be made in the invention without departing from the spirit and scope thereof.

What is claimed is:

1. An apparatus comprising:
   a material cylinder for receiving a blank to be extruded, a ram head slidably engageable in said material cylinder, a hydraulic plunger having a piston connected to said ram head, an evacuating cap provided slidably in an air-tight manner on said piston and having evacuating pipes, and a blowdown valve provided in said ram head for closing an opening an air blow aperture formed in said ram head, wherein said ram head comprises a flat surface which is in contact with said blank in said material cylinder, and an O-ring arranged in said flat surface of said ram head about said air blow aperture, and said blowdown valve comprises a T-shaped head which is movable into contact with said flat surface of said ram head through said Oring to close said air blow aperture when the ram head is being advanced in said material cylinder to extrude said blank therefrom.

2. Apparatus as set forth in claim 1, wherein said blowdown valve comprises a stem and the Tshaped head connected to said stem by means of at least one set screw.

3. Apparatus as set forth in claim 1, wherein a center portion of said ram head formed with said air blow aperture cooperating with said blowdown valve is made of a stainless steel different from a material of a remaining portion of the ram head.

* * * * *